United States Patent Office 3,795,521
Patented Mar. 5, 1974

3,795,521
VISCOSITY CONTROLLED PECTINOLYTIC ENZYME ADDITION TO FRUIT AND VEGETABLE JUICE
Jean-Paul Richard, 46 Bd Raspail, Paris, France
Filed Nov. 1, 1971, Ser. No. 194,459
Claims priority, application France, Nov. 2, 1970, 7039364
Int. Cl. C12b 1/02
U.S. Cl. 426—51                  3 Claims

ABSTRACT OF THE DISCLOSURE

A process for the production of stable juices, of controlled clarity or turbidity or pulpy in which the depectinization is carried out continuously under closely controlled conditions, particularly by controlling the enzyme concentration, the temperature and the time. This allows the set up of a continuous production line from juice extraction to bottling with the elimination of the conventional fining and settling processes. The viscosity of the juice before and after depectinization is measured and used as a control parameter.

BACKGROUND OF THE INVENTION

The present invention relates to a process for manufacturing fruit juices or vegetable juices and to an installation enabling this process to be carried out.

The conventional manufacture of fruit juices such as apple juice for example, comprises the following operations: washing the apples, grating and extraction of the juice, clarification, pasteurization, storage and conditioning.

Whereas the washing, grating, juice extraction and pasteurization operations can be carried out continuously, the clairfication operation has always been discontinuous; clarification in conventional practice comprises several stages as follows:

(i) Suppression of the coarser elements, such as cellular debris, either by sieving, centrifuging or by decanting continuously;

(ii) Depectinization, which has as its object the cutting of the pectin molecules in such a way as to favor subsequent filtration, and which utilizes pectinolytic enzymes;

(iii) Fining; since depectinization has not bee sufficient to ensure complete stabilization of the juce, to prevent subsequent turbidity from appearing, a setting operation is carried out using an excess of positively charged fillers either in the form of gelatine or albumen, the most common examples, or in the form of tannin;

(iv) Filtration, after depectinization and fining, which generally yields a perfectly clear and bright juice.

However, in spite of depectinization and fining, it is found that after several weeks of storage in tanks, turbidity again occurs in the juice necessitating supplementary filtering before the final bottling. This means a continuous production line from fruit to bottles cannot be envisaged.

The conditions of operation of pectinolytic enzymes as they are used in the known processes, employ slow enzymatic reaction speeds. Generally the pectinolytic enzymes are introduced into the juice to be treated in a proportion of from 5 to 50 grams of pectinolytic enzymes per hecto-litre and the duration of depectinization varies from 1 to 8 hours, depending upon the temperature at which this operation is carried out. No monitoring of this process has previously been practiced and the absence of a check upon the depectinization operation means that the action of the pectnolytic enzymes may be inadequate, thus making filtration difficult, as a result of clogging of the filter, or indeed it may be too drastic, leading to the existence within the juice treated of small negatively charged particles which associate themselves progressively with positively charged particles, the aggregation of these together leading to insolubility.

In theory, the addition of an excess of positively charged particles in the form of gelatine or tannin for fining serves to carry away the entirety of the fillers as a mass and thereby eliminate the appearance of subsequent turbidity. However an excess of fining leads to absorption of the aromatic principles contained in the juice; and, although such absorption does not present a major difficulty in the case of juices which are sufficiently acid, it is unacceptable in the case of juices which are sparingly acid; in these it can alter or even completely suppress the taste, especially in the case of juices extracted from golden apples. In addition, although the gelatine is eliminated at the end of the fining operation, it nevertheless leaves in the juice a heavier taste, which is not the taste of juices which have not been fined.

Finally, if the pectinolytic enzymes have not been completely destroyed during the depectinization operation and the pasteurization operation which follows it, they continue to act and cause a new dis-equilibrium of the fillers, leading to turbidity in the storage tanks.

The present invention therefore has as one object the provision of a process for manufacturing fruit or vegetable juices which includes an improved clarification stage.

Another object of the invention is the elimination of the fining process.

A further object is to provide an operation which may be carried out continuously, by means of an apparatus which permits the use of entirely continuous and automatic production lines.

SUMMARY OF THE INVENTION

According to the present invention the depectinization is carried out under closely controlled optimum conditions so that no fining is needed and the depectinized juice is stabilized, and after filtering and pasteurization needs no further treatment.

In one aspect the invention provides a process for the production of stable juices from fruit and vegetable products which comprises extracting the juice from the product and removing cellular debris, subjecting the juice to a depectinization process with pectinolytic enzymes while closely controlling the speed of enzymatic reaction to a rate which is sufficiently high for the optimum depectinization to take place continuously at the same time as a rapid coagulation of the proteins present and a rapid denaturation of the pectinolytic enzymes, hot filtering the depectinized juice and then passing the filtered juice through a pasteurization stage.

The invention further provides a continuous process for the production of stable juices from fruit and vegetable products which comprises extracting the juice from the product and removing cellular debris, adding pectinolytic enzymes to the juice to obtain a mixture of juice and pectinolytic enzymes of controlled concentration, continuously passing the mixture through a heated enclosure at a controlled temperature and flow rate, continuously filtering the mixture leaving the heated enclosure, and continuously passing the filtrate through a pasteurization stage, the juice leaving the pasteurization stage being ready for enclosure in containers.

The calculation of the optimum concentration of pectinolytic enzymes in the juice to be treated and the determination of the optimum time/temperature combination for the depectinization of the medium and for the coagulation of the proteins to be simultaneously the best, are carried out by measuring the viscosity variation of the medium before and after depectinization. The measurement of the viscosity of the juice before and after depectinization during the process is then used to control the flow rate of enzymes into the juice in such a way that a predetermined desirable enzymes concentration is introduced into the juice to be treated. In addition or alternatively it may be used to control the time and/or temperature of the depectinization process.

By controlling these variables in desired combinations it is possible to preselect the degree of clarity and the yield of the finished products, to achieve the optimum depectinization and to select an optimum filtration temperature.

The method of manufacture of fruit or vegetable juices of exactly controlled clarity which has just been defined above is based upon the researches of the applicant, which have enabled him to demonstrate a certain number of relationships between the characteristics of the product finally obtained and the conditions of production of this product.

In effect, during the course of his researches, the applicant has been able to establish a relationship between the quantity of product obtained after enzymatic action and filtration, and the speed of the enzymatic reaction, the temperature of the said reaction and the enzymes concentration of the medium treated.

In addition, during the course of his researches, the applicant has been able to establish the correspondence which exists between the filtration time graphs of the depectinized products and the viscosity graphs.

He has adopted as a basis for his researches the establishment of the fact that the speed of the enzymatic reaction is an exponential function of the temperature and, within certain limits, a linear function of the enzymes concentration in the medium.

The present invention also has as its object an apparatus for the continuous production of fruit or vegetable juices of controlled clarity.

In a further aspect the invention provides apparatus for the continuous production of stable juices from fruit and vegetable products comprising control means for controlling the introduction of pectinolytic enzymes into juice extracted from the product to produce a mixture with an exactly controlled enzyme concentration, and pump means for continuously passing this mixture through a heated environment at a controlled temperature for a controlled time.

Preferably means are provided for measuring the viscosity of the juice at the inlet to the heated environment and at the outlet thereof (after filtering) and the control means use this measurement to control the enzyme introduction means, the pump means and/or the means for heating the environment.

DETAILED DESCRIPTION OF THE INVENTION

The invention will be better understood with the help of the following description, which relates to a non-limiting example of an embodiment of the invention, reference being made to the accompanying drawings of which:

Figure 1:
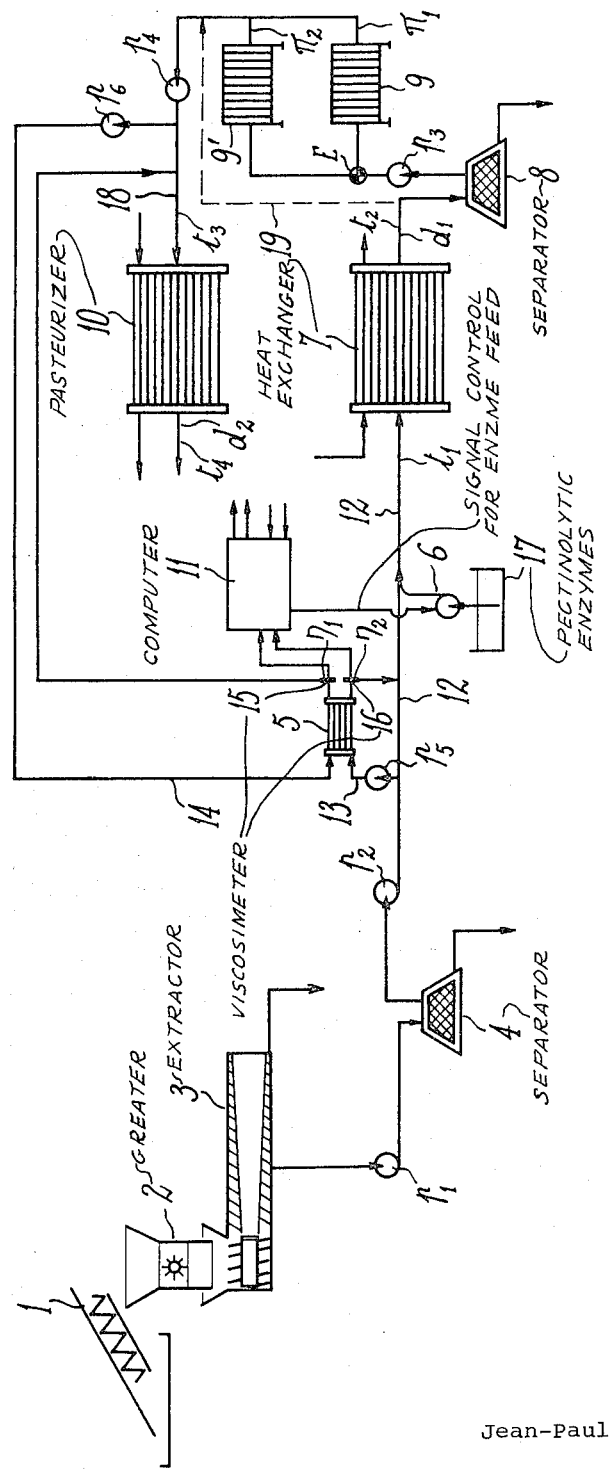
FIG. 1 is a schematic diagram of a continuous fruit juice production line.

A production line for fruit or vegetable juices comprises a supply system 1 for fruits or vegetables, such as a feed screw for example, a grater 2, where applicable (for those cases where it is intended to obtain juices from fruits or vegetables which require preliminary grating), and an extractor 3 in which the juice is extracted from the fruits or vegetables, thus favoring the rupturing of the cells of which the fruits or vegetables are composed, the juice obtained being however full of cellular debris containing in particular cellulose fractions and pectin fractions; following the extractor 3 is an apparatus 4 suitable for separating the juice from the cellulose fractions which it contains; this apparatus for example may be a centrifuge, a sieve or a continuous decanter. The juice from the apparatus 4 is then passed on line 12 to a heated container through which it continuously passes, in this case a heat exchanger 7 in which a depectinization operation is carried out.

The depectinization operation is made necessary by the fact that the pectin fractions contained by the juice prevent the filtering of the latter, as they are the principal cause of the clogging of the filters. A portion of the juice passing along line 12 is taken off on a bypass line 13 by pump $p_5$ and passed through a heat exchanger 5 before being returned to the line 12.

A pump 6 under the control of a servo control unit 11 pumps a controlled quantity of pectinolytic enzymes from a reservoir 17 into the juice in line 12.

The depectinized juice obtained at the outlet from the heat exchanger 7 is continuously passed through a decanter or other separator 8 and is then filtered on a plate or cloth filter 9–9′ by means of a filtration addition, such as for example kieselguhr. The filtered juice obtained is conveyed on line 18 for pasteurization which is carried out continuously in a heat exchanger 10.

At the outlet from the heat exchanger 10, the juice needs no further treatment and is transmitted to a conditioning unit, or for storage under sterile conditions, or for immediate bottling or canning.

Pasteurization has as its purpose:

(a) Prevention of any contamination which could arise during the course of filtration,
(b) Prevention of any residual enzymatic activity.

Pasteurization should be carried out under time and temperature conditions which are also defined to avoid the appearance of subsequent turbidity.

It is possible to eliminate the use of kieselguhr by centrifuging the juice at the outlet from the heating and by conveying the centrifuged juice to a filter known as a "polishing" filter.

If it is desired to obtain a juice having controlled and stable turbidity rather than clarity, it is sufficient to modify the conditions for concentrating with enzymes and the depectinization time/temperature combination so that coagulation in particular, but not solely coagulation, takes place not during heating in the exchanger 7 but during the pasteurization or cooling of the juice.

A portion of the filtered juice in line 18 is extracted on line 14 by a pump $p_6$ and passed through the heat exchanger 5 to heat the untreated juice in line 13 before being returned to line 18. The treated and untreated juices leaving the heat exchanger 5 then have approximately the same temperatures and their respective viscosities are measured by two viscosimeter probes 15, 16, the viscosity measurements being supplied to the controller 11 and the difference in these measurements being used as a control parameter.

In the preferred form of the invention the difference in viscosity $\eta_2-\eta_1$ ($\eta_2$ is viscosity before depectinization and $\eta_1$ is viscosity after depectinization and filtering) is used to control the addition of enzymes by controlling the pump 6 so as to maintain a predetermined desired constant viscosity difference. Generally the times and temperature in the two heat exchangers 7 and 10 will be maintained within desired limits; however the viscosity measurement can also be used to control the flow rate of steam to the heat exchangers 7 and 10 and/or the juice flow rate instead of or as well as the enzymes dosing pump 6. In addition control may be carried out to maintain the final viscosity $\eta_1$ within a desired range.

Figure 2:
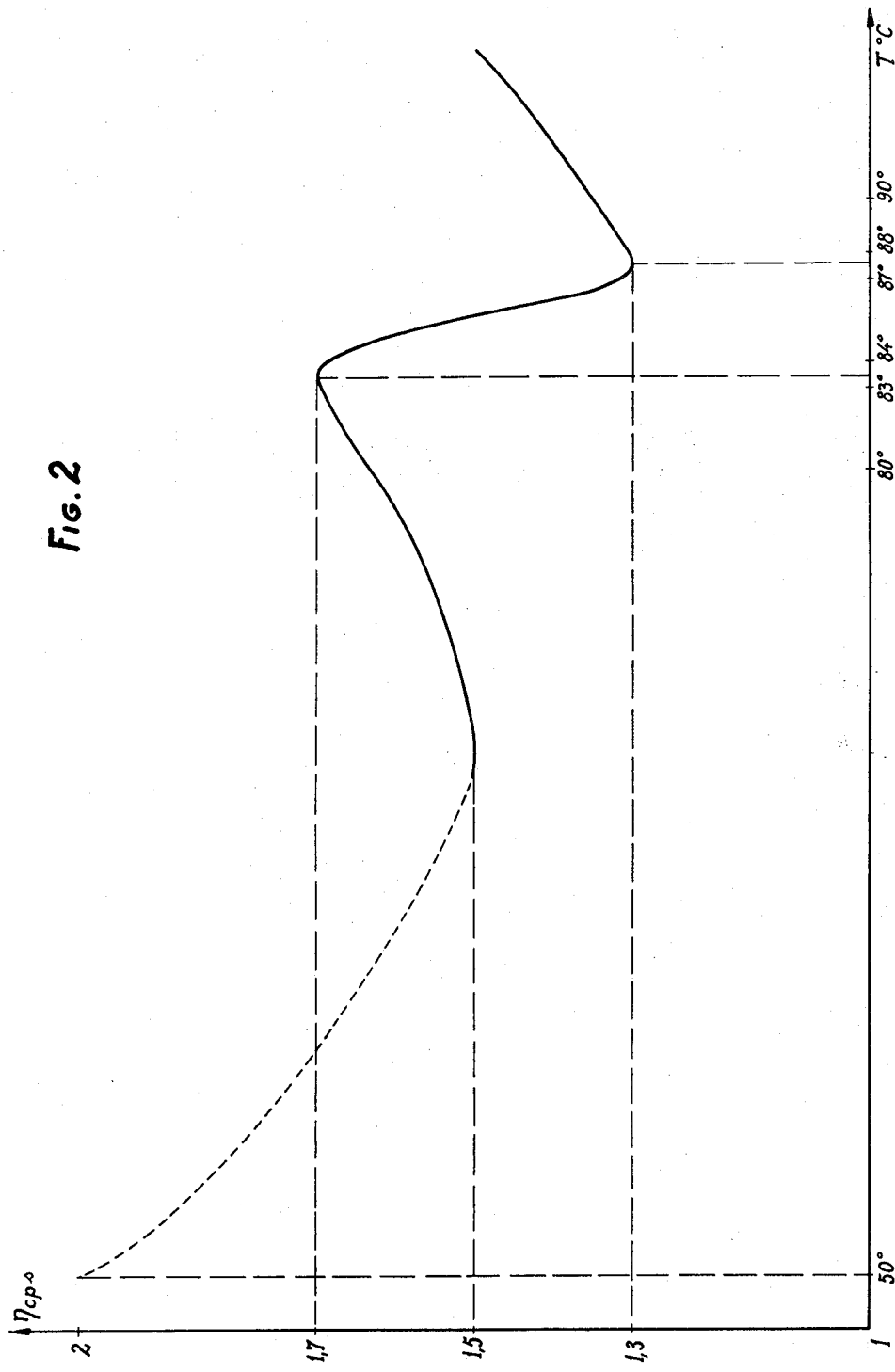
FIG. 2 is a graph showing the viscosity change during depectinization at different temperatures.

Because of the importance of the coagulation phenomenon (coagulation of the proteins present) and of the two viscosity minima resulting therefrom on the curve $\eta=f(t, \theta)$ (FIG. 2) the control system is made to control both the flow rate $d_1$ through the heat exchanger 7 and the temperatures $t_1$ and $t_2$ at which the juice enters and leaves the heat exchanger 7, so as to control both the flow and thus the time of treatment ($\theta$) and the pressure of the steam (and thus the temperature of treatment ($t$)).

The temperature difference $t_4-t_3$ and the flow rate $d_2$ applied to the heat exchanger 10 are also maintained constant by means of the servo control system 11.

To summarize, the dosing pump 6 is subjected to control under the automatic and continuous measurements of the viscosities $\eta_1$, $\eta_2$ and of their difference $\eta_2-\eta_1$ in such a way that the quantity of enzymes injected into the circuit keeps $\eta_2-\eta_1$ substantially constant and $\eta_1$ within a predetermined range. In addition the temperatures and flow rates applied to the two heat exchangers are also kept constant by means of the regulating system 11.

Finally, if 9 and 9' are polishing filters functioning alternately, the change will be made automatically from 9 to 9' by means of the automatic valve E, when the pressures $\pi_1$, $\pi_2$ alternately reach the limiting clogging value. In the case of a continuous filter, the problem will clearly be simplified.

The following are therefore servo controlled:

The flow rates and pressures of steam, by means of the continuous determination of the temperatures $t_1$, $t_2$, $t_3$, $t_4$, correlated if necessary with the flow measurements $d_1$ and $d_2$;

The flow rates at the various position of the production line by causing the rates of the pumps $p_1$, $p_2$, $p_3$, $p_4$, (respectively supplying juice to the separator 4, the heat exchanger 7, the filters 9, 9' and the heat exchanger 10) to vary in accordance with the desired flows $d_1$ and $d_2$, corrected by the pressures $\pi_1$ and $\pi_2$ and possibly also by the temperatures $t_1$, $t_2$, $t_3$, $t_4$;

The speeds of the supply system 1, such as supply screw, the grater 2 which may be present in the production line and the extractor 3 may also be servo-controlled in such a way that the flow rate $d_1$ is maintained at the desired value;

The dosing pump 6 is subjected to the measurements $\eta_1$, $\eta_2$, $\eta_1-\eta_2$, all the other parameters being also regulated.

All possible combinations between the various mentioned parameters may be envisaged, as well as the continuous measurement of any other parameter taking into account the clarification state or otherwise of the juice.

The regulation system in accordance with the present invention therefore permits the integral servo control of a production line for fruit or vegetable juices from the arrival of the fruits or vegetables right up to conditioning or storage.

In addition it is possible to obtain:
either clear or bright juices,
or turbid juices of controlled opacity,
or pulpy juices.

For these latter the pump 6 does not have to operate, but the difference $\eta_1-\eta_2$ should be zero and this measurement should control the difference $t_4-t_1$, the filters 9 and 9' and the decanter 8 being no longer in the circuit and the juice therefore adopting the path indicated by the pipe 19. This is the case in particular for tomato juices.

There will be found below an example of the present invention, in its application to the production of apple juice, it being understood that this example is given solely by way of illustration of the invention and has no restrictive character.

Into a pilot installation constructed in accordance with the arrangements of the present invention, there are introduced, into the supply screw 1, 250 kg. per hour of apples which, after washing, are treated in the grater 2 and the extractor 3, which, in the present case, is constituted by a continuous press. The juice obtained is then conveyed to the apparatus 4.

The juice freed of cellulose fractions is then transmitted into the heat exchanger 7, which may with advantage, but not restrictively, be a plate-type heat exchanger; the temperature of the juice $t_1$, before its entry into the heat exchanger 7, is 20° C.

In the example described here, the average concentration of enzymes supplied by the pump 6 under control of controller 11 is 7.5 g./hectolitre of juice treated, it being understood that the concentration of enzymes in the medium will vary as a function of viscosity measurement, within limits which may lie between 3 and 8 g./hectolitre of juice, without these limits being critical.

The capacity of the heat exchanger 7 is 200 ml. and the contact time for combination of the juice to be treated and the enzymes is from 2 to 4 seconds.

The juice treated leaves the heat exchanger at a temperature $t_2$ of the order of 87–88° C., at flow rate $d_1$ of 175 litres per hour.

After decanting into the continuous decanter (which may also be a centrifuge or a sieve) 8 the juice is filtered at the same temperature in filters 9, 9', from whence it is conveyed to pasteurization by the duct 18, while it is at a temperature $t_3$ of the order of about 70° C. Pasteurization is carried out in the heat exchanger 10, from where the completed juice leaves at a temperature $t_4$ of 90 to 92° C. to be immediately bottled or dispatched for storage in sterile tanks.

The regulation and servo-control device 11 regulates not only the concentration of enzymes in the juice, but also the flow rates and pressures of steam, the flow rates of pumps $p_1$, $p_2$, $p_3$, $p_4$, thus acting on the flow rates of the various stations of the production line, and the temperatures.

It will be noted that here the time in the depectinization heater is less than one minute as opposed to the previous depectinization processes which occupied days.

It follows from the preceding description that whatever may be the methods of embodiment, realization and application adopted, methods and installations for continuous production of fruit or vegetable juices of controlled clarity are obtained, which possess, by comparison with the methods and apparatus having the same purpose previously known, important advantages; these are especially:

The advantage of enabling complete continuity of production of fruit or vegetable juices; in effect, there exist for the production of fruit or vegetable juices continuous extractors, continuous pasteurizers, continuous bottlers but in the absence up till now of continuous depectinization, the production line necessarily had to be discontinuous. The process and installation in accordance with the present invention enable production lines for fruit or vegetable juices which are completely continuous to be achieved, as a result of which it is possible from now on to remove the storage tanks and to effect complete automation of the production line.

The advantage of permitting the realization of appreciable economy in labor, not only by reason of the continuity of the process, but also because of the simplification resulting therefrom for the entirety of the production line.

The advantage of making fining needless, and of effecting, because of this, a saving of fining agents.

The advantage of enabling appreciable economies of enzymes to be achieved, due to the fact that the process and installation according to the present invention enable only the exact quantity of depectinization enzymes necessary to be used.

The advantage of enabling substantial investment economies to be achieved, due to the elimination of the storage tanks, the moderateness of the initial cost of the regulation apparatus and the justification of the investments represented by the installation of a continuous production line.

The advantage of enabling turbid juices of constant opacity, fixed in advance and stable, to be obtained.

The advantage of being able to be applied to the production of pulpy juices such as orange juice or tomato juice, possessing natural pectinolytic enzymes; for these it is desired to ensure that the latter have definitely been destroyed before conditioning, whereby the variation of viscosity should be zero in such an application.

The advantage of avoiding browning due to Maillard reactions, which occur when the juices are fined with gelatine.

And finally, the advantage of giving rise to a final product the quality of which is very appreciably improved as compared with that of the fruits or vegetable juices obtained by using the processes and apparatuses previously known.

As will be apparent from the above, the invention is not in any way restricted to those of its methods of embodiment, realization and application which have been described in a more detailed manner in the above; on the contrary, it encompasses all the variants which can be realized by of the technical person skilled in this field, without departing from the framework and scope of the present invention.

What is claimed is:

1. In a continuous process for the production of stable juices from fruit and vegetable products, which comprises extracting juice from the product, removing cellular debris from the juice and subjecting the resultant juice to depectinization with pectinolytic enzymes, the improvement wherein the juice containing the pectinolytic enzyme is heated to a temperature of the order of 87–88° C. for a time less than one minute, and the viscosity of the juice is measured immediately before and after depectinization, the difference between said viscosity measurements being fixed at a predetermined value based on the desired degree of clarity of the stable juice and wherein said value is used as a parameter to regulate the enzyme injection flow rate into the depectinization step.

2. The process according to claim 1 in which the mixture of juice and enzyme pass continuously through a heated enclosure and the viscosity measurements are made on the mixture before entering the heated enclosure and after leaving the heated enclosure.

3. The process according to claim 1 in which a portion of the juice after depectinization is used to heat a portion of the juice entering to the depectinization stage to achieve substantial temperature equilibrium and the viscosity measurements are made on these portions after such temperature equilization.

References Cited

UNITED STATES PATENTS

| | | | |
|---|---|---|---|
| 3,666,487 | 5/1972 | Yokotsuka | 99—106 |
| 2,325,573 | 7/1943 | Thompson | 195—31 |
| 3,236,655 | 2/1966 | Murch | 99—106 |

OTHER REFERENCES

Food Industries, August 1933, pp. 294–295, 30, Willaman.

NORMAN YUDKOFF, Primary Examiner

H. H. BERNSTEIN, Assistant Examiner

U.S. Cl. X.R.

195—103.5; 426—495